United States Patent [19]

McCoy et al.

[11] 4,384,951

[45] May 24, 1983

[54] DEMULSIFICATION OF BITUMEN EMULSIONS USING POLYUREAS

[75] Inventors: David R. McCoy, Austin, Tex.; Kitchener B. Young, Ft. McMurray, Canada

[73] Assignees: Texaco Canada Resources, Ltd., Alberta, Canada; Texaco Inc., White Plains, N.Y.

[21] Appl. No.: 326,458

[22] Filed: Dec. 2, 1981

[51] Int. Cl.³ .................. C10G 33/04; C30B 3/00; C09K 3/00
[52] U.S. Cl. .................. 208/188; 252/358; 210/708; 210/735
[58] Field of Search .......... 208/188; 252/358; 210/708, 735

[56] References Cited

U.S. PATENT DOCUMENTS

| | | | |
|---|---|---|---|
| 3,594,393 | 7/1971 | Buriks | 252/327 |
| 3,640,894 | 2/1972 | Sampson | 252/344 |
| 4,016,101 | 4/1977 | Markofsky | 252/358 |
| 4,029,708 | 6/1977 | Seitz et al. | 252/358 |
| 4,321,148 | 3/1982 | McCoy et al. | 252/341 |

FOREIGN PATENT DOCUMENTS 1112908 5/1968 United Kingdom .
1213392 11/1970 United Kingdom .

Primary Examiner—Delbert E. Gantz
Assistant Examiner—Helane E. Maull
Attorney, Agent, or Firm—Carl G. Ries; Jack H. Park; Kenneth R. Priem

[57] ABSTRACT

A process for recovering bitumen from oil-in-water (O/W) emulsions is disclosed wherein water soluble demulsifiers are used. These demulsifiers are polyureas of average molecular weight greater than about 5,000 prepared by the reaction between a polyisocyanate and a polyoxyalkylenediamine. To resolve the bituminous petroleum emulsions, the process is carried out between 25° and 160° C. wherein the demulsifier of the invention is contacted with the bituminous emulsion.

5 Claims, No Drawings

DEMULSIFICATION OF BITUMEN EMULSIONS USING POLYUREAS

BACKGROUND OF THE INVENTION

1. Field of the Invention

This invention is concerned with the breaking or resolution of oil-in-water (O/W) bituminous emulsions by treatment with polyureas.

2. Description of the Prior Art

A great volume of hydrocarbons exist in known deposits of tar sands. These deposits occur at various places, the Athabasca tar sands in Canada being an example. The petroleum in a tar sand deposit is an asphaltic bitumen of a highly viscous nature ranging from a liquid to a semisolid. These bituminous hydrocarbons are usually characterized by being very viscous or even non-flowable under reservoir conditions by the application of driving fluid pressure.

Where surface mining is not feasible, the bitumen must be recovered by rendering the tar material mobile in-situ and producing it through a well penetrating the tar sand deposit. These in-situ methods of recovery include thermal, both steam and in-situ combustion and solvent techniques. Where steam or hot water methods are used, a problem results which aggravates the recovery of the bitumen. The difficulty encountered is emulsions produced by the in-situ operations. These emulsions are highly stable O/W emulsions which are made even more stable by the usual presence of clays. Most liquid petroleum emulsions are water-in-oil (W/O) types. These normal W/O emulsions are broken by methods known in the art. However, the bitumen emulsions which are O/W types present a much different problem, and the same demulsifiers used in W/O emulsions will not resolve the O/W bitumen emulsions. The uniqueness of these O/W bitumen emulsions is described in C. W. W. Gewers, *J. Canad. Petrol. Tech.*, 7(2), 85–90 (1968). (Prior art Reference A.) There is much prior art concerning the resolution of normal W/O emulsions. Some of the art even mistakenly equates bitumen O/W emulsions with these W/O emulsions. The following is a list of several art references.

B. British Pat. No. 1,213,392 discloses a polyurethane for breaking W/O emulsions.

C. British Pat. No. 1,112,908 discloses the use of polyurethanes to break W/O emulsions. Even in a discussion of prior art, this British Patent discusses hydrophilic polyurethanes and indicates that they are ineffective for breaking emulsions.

D. U.S. Pat. No. 3,594,393 is also concerned with breaking W/O emulsions with polyurethanes.

E. U.S. Pat. No. 3,640,894 discloses polyurethanes and polyurethanes used in combination with Novolak alkoxylates to break W/O emulsions.

F. U.S. application Ser. No. 152,453 filed May 22, 1980, now allowed, claims a process for recovering petroleum from bitumen emulsions by demulsifying the emulsions with the reaction product of a polyisocyanate and diols and triols wherein the resulting polyurethane is greater than about 8,000 molecular weight.

It is an object of the present invention to provide a method whereby O/W bitumen emulsions may be broken by treatment with a class of polyureas.

SUMMARY OF THE INVENTION

The invention is a method for recovering petroleum from O/W bitumen emulsions by resolving or breaking these emulsions by contacting the emulsions at a temperature of from between about 25° and 160° C. with a polyurea prepared by the reaction under appropriate conditions of temperature and catalysis of a polyisocyanate and a diamine or mixture of diamines containing alkyleneoxy units having the general structure

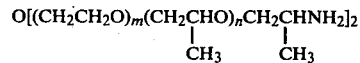

where m is from 0 to 30 and n is from 0 to 5 and wherein the polyurea contains at least 70% by weight ethyleneoxy units and wherein the polyurea has an average molecular weight equal to or greater than about 5,000.

DESCRIPTION OF THE PREFERRED EMBODIMENTS

The process of this invention utilizing the chemical demulsifier as described above utilizes as a chemical demulsifier a particular polyurea.

Especially useful and preferred in this process are polyureas prepared by reaction under appropriate conditions of temperature and (optionally) catalysis of the following two components: (a) a polyisocyanate, especially diisocyanate such as TDI or MDI of molecular weight under 500, and (b) a diamine containing alkyleneoxy units having the general structure.

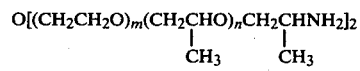

wherein m is from 10 to 22 and n is from 0 to 1.5. The polyureas useful in this invention have an average molecular weight equal to or greater than about 5,000. Especially useful as the diamine containing alkyleneoxy component of the polyurea are the JEFFAMINE® ED series polyoxyalkylenepolyamines from Texaco Chemical Company prepared by reductive amination of an appropriate diol. An especially useful JEFFAMINE polyoxyalkylenediamine has a structure as above wherein m is 20.9 and n is 0.75. The relative values of m and n and the weight ratios of the diisocyanate and the diamines must be adjusted so that the final polyurea has a weight percent ethyleneoxy content of about 70% or greater. Mixtures of different polyoxyalkylenediamines may also be used. For example, the hydrophilicity of the demulsifier may be adjusted by one skilled in the art to maximize effectiveness on a particular emulsion. This may be done by adjusting the values of m and n in the product or by blending different products.

The produced bitumen emulsions may be treated by the process of our invention in a conventional manner, for example, in a conventional horizontal treater operated, for example, from about 25° to 160° C. and, preferably, from about 50°–150° C. at autogenous pressures. The concentration of the chemical demulsifier described above used in treating the bitumen in water emulsions may range from about 1 to 200 parts per million and, preferably, from about 10 to 100 parts per million with the optional addition of an organic diluent and/or inorganic salt as well as standard flocculants and mechanical or electrical means of demulsification. The following examples describe more fully the present process. However, these examples are given for illustration and are not intended to limit the invention.

The examples which follow describe the preparation of chemical demulsifiers of the invention and the demulsification test results.

EXAMPLE I

Polyurea Demulsifier

A one-liter resin flask was charged with 200 grams of JEFFAMINE ® ED-2001 with structure

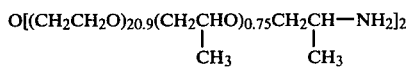

The starting material was dried by stirring at 0.1 mm Hg pressure at 100° C. for one-half hour. To this material was added 400 grams toluene (previously dried over 3 angstrom molecular sieves) and 0.2 grams 2,6-di-t-butyl-p-cresol. 13.5 ml toluene diisocyanate was added with stirring over a five minute period at 50° C. The reaction mixture was then stirred under nitrogen for one hour at 60° C. and two hours at 100° C. The reaction mixture was then vacuum stripped to remove solvent. The product of this reaction was found to contain 0.017 meq/g total amine and was shown to have a molecular weight of 12,600 by liquid chromatographic analysis, using poly(ehtyleneoxy)glycol standards.

EXAMPLE II

Low Molecular Weight Analog of Product of Example I

The general procedure of Example I was repeated using 0.5 moles toluene diisocyanate per mole of JEFFAMINE ED-2001 to obtain a product with an approximate molecular weight of 4,200 and containing 0.41 meq/g total amine.

EXAMPLE III

Mixed Poly(Urea-Urethane)

A one-liter resin flask was charged with 194 grams of 7,500 molecular weight poly(ethyleneoxy)glycol which was dried in vacuum at 100° C. for one-half hour. To this were added 400 grams toluene, 0.2 grams 2,6-di-t-butyl-p-cresol and 0.08 grams dibutyl tin dilaurate. To this mixture was added 6 grams JEFFAMINE ® D-230 (230 molecular weight diamine prepared by reductive amination of a poly(propyleneoxy)glycol), followed by addition of 6.7 ml toluene diisocyanate at 50° C. over a six minute period. The reaction mixture was stirred under nitrogen for one hour at 50° and then two hours at 100°. Solvent was removed under reduced pressure, leaving a product of high molecular weight too insoluble in most solvents to obtain adequate analysis.

EXAMPLE IV

Polyurea from a Mixture of Diamines

193 Grams JEFFAMINE ED-2001 was dried as in Example I. To this were then charged 7 grams JEFFAMINE D-230, 0.2 grams 2,6-di-t-butyl-p-cresol and 300 grams dry toluene. 16.0 milliliters toluene diisocyanate was added to 50° C. over eight minutes and the mixture was digested under $N_2$ for one hour at 50° and two hours at 100°, adding 300 grams additional toluene to reduce solution viscosity. Solvent was removed under reduced pressure and the resulting polymer found to contain 0.01 meq/g total amine and have an average molecular weight of 6,990.

EXAMPLE V

Low Ethyleneoxy-Content Polyurea

Charged one-liter resin flask with 200 grams JEFFAMINE ED-900 having general structure

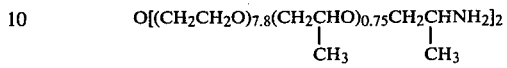

and dried under reduced pressure for one-half hour at 80° C. Added 400 grams toluene and 0.2 grams 2,6-di-t-butyl-p-cresol. At 50° C. added 30.6 ml toluene diisocyanate over five minutes. Cooled reaction mixture after 35 minutes at 69–70° C. and removed solvent under reduced pressure. The product had a weight average molecular weight of 5,689 by liquid chromatographic analysis.

EXAMPLE VI

Higher Molecular Weight Analog of Product of Example IV

Repeated procedure of Example IV using 600 grams toluene, 16 ml toluene diisocyanate and digestion times of one hour at 60–70° C., followed by one hour at 100° C. The stripped product had a molecular weight of 13,400 and contained 0.036 meq/g total amine.

EXAMPLE VII

Mixed Poly(Urea-Urethane) from Amino Alcohol

A one-liter resin flask was charged with 200 grams of a product obtained by incompletely reductively aminating (34.7 mole% conversion) a diol of the general structure

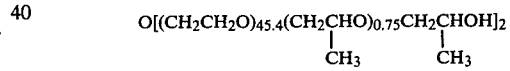

This compound was dried at 100° C. for one-half at reduced pressure. To this were charged 0.08 grams dibutyl tin dilaurate, 500 grams dry toluene and 0.2 grams 2,6-di-t-butyl-p-cresol. Then 6.2 ml toluene diisocyanate was added at 50° C. over four minutes and then mixture digested under nitrogen for one hour 50° and two and ¼ hours at 100°. Solvent was removed under reduced pressure to leave a product containing 0.01 meq/g total amine and having a weight average molecular weight of 30,879.

EXAMPLE VIII

Demulsifier Testing of Products from Example 1–4

The method employed for testing the products of Examples 1–4 is as follows:

(a) A 1% solution of each chemical was prepared (in $H_2O$ or in toluene).

(b) 100 ml of fresh, hot bitumen emulsion of known bitumen content obtained by in-situ steam flooding in tar sand pattern located at Ft. McMurray, Alberta, Canada was poured into a sample bottle.

(c) 50 parts (volume) of Wizard Lake crude was added as diluent to 100 parts bitumen contained in the emulsion.

(d) Chemical was added to the diluted emulsion at the following concentrations: 10, 20, 30, 50, 75 and 100 ppm.

(e) Contents of the bottle were mixed and placed in an oven at 180–200° F. for a 24-hour period.

(f) BS&W determinations were made on the oil layer.

With each emulsion, a blank was also run in which no chemical agent was introduced. Similar results were obtained from all these blanks; namely, the sample consisted of a thin upper layer consisting mainly of diluent (sometimes containing substantial water), a broad middle layer consisting of unbroken emulsion, and a small (sometimes non-existent) dark water layer containing particles or chunks of solid bitumen and clay.

Comparison results for no demulsifier and a poly(ethylene oxide) demulsifier are also included.

EXAMPLE IX

Demulsifier Testing of Products from Example 5–7

The general method employed in testing the products of Examples 5–7 is as follows:

(a) A 1 wt.% solution of each chemical was prepared (in water or acetone).

(b) A 30 ml PYREX ® test tube equipped with screw top was charged with 23 ml emulsion of 11.5 wt.% bitumen content obtained by in-situ steam flooding in tar sand pattern located at Ft. McMurray, Alberta, Canada.

(c) 2 ml Wizard Lake crude oil was added as diluent and the contents of the test tube were mixed.

(d) The contents of the test tube were equilibrated in a 80° C. oven for 1-2 hours and mixed again.

(e) Chemical was added to the hot, dilute emulsion at the following concentrations: 30, 60, 120 ppm.

(f) Contents of the test tubes were mixed, re-equilibrated in an oven at 80° C. for 1 hour and mixed again.

(g) After 20 hours of standing at 80° C., measurements were made on the volume of top and middle layers, and the appearance of the aqueous phase was noted. Samples of some top layers were carefully removed by pipetting and subjected to Karl Fischer analysis for determination of the water content.

DEMULSIFIER TESTING

| Ex. 8 | Candidate Demulsifier | % Bitumen in Emulsion | Treated Emulsion % BW & W in Oil (ppm chemical used) | Middle Phase | Water Phase |
|---|---|---|---|---|---|
| a | Product of Ex. 2 | 12–16 | 13 (100) | Wide and unstable | Muddy |
| b | Product of Ex. 3 | 14 | 6 (50) | Thick | Just translucent |
| c | Product of Ex. 3 | 14 | 30 (100) | Quite small | Just translucent |
| d | POLYOX ® WSR-301* | 14 | 31 (50) | Large | Heavily clouded |
| e | None | 14 | 46 | Moderate | Dark, muddy |
| f | Product of Ex. 1 | 20 | 4 (20) | Small | Light, muddy |
| g | Product of Ex. 1 | 20 | 2.5 (75) | None | Light, muddy |
| h | POLYOX WSR-301* | 20 | 4.5 (20) | Moderate | Light, muddy |
| i | None | 20 | 18 | Very large | Brown, muddy with bottom deposit |
| j | Product of Ex. 4 | 20 | 4.5 (20) | Moderate | Brown, muddy |
| k | Product of Ex. 4 | 20 | 3 (100) | None | Light, muddy |
| l | POLYOX WSR-301* | 20 | 5 (20) | Moderate | Heavily clouded |
| m | None | 20 | 5 | Very wide | Brown, muddy with large bottom deposit |

*Commercial 4,000,000 molecular weight poly(ethylene oxide)
Note:
Horizontal lines on left group tests run on same day and on same emulsion.

DEMULSIFIER TESTING

| Example 9 | Candidate Demulsifier | Concentration ppm | Oil Phase Volume in ml (% H$_2$O) | Emulsion Phase Volume in ml (% H$_2$O) | Aqueous Phase Appearance |
|---|---|---|---|---|---|
| a | Product of Example 5 | 60 | 7 (59.6) | 0 | Muddy with solid deposits |
| b | Product of Example 5 | 120 | 3.5 | 3 | Muddy |
| c | Product of Example 6 | 60 | 7 (8.77) | 1.5 | Muddy |
| d | Product of Example 7 | 60 | 5 | 3 | Muddy |
| e | Product of Example 7 | 120 | 7 (86) | 2 | Muddy |
| f | POLYOX WSR-301 | 60 | 7.5 (60) | 0.5 | Yellow, translucent |
| g | None | — | 1.5 | 3.5 | Muddy |

We claim:

1. A process for recovering petroleum from O/W bitumen emulsions by demulsifying said emulsions by adding thereto demulsifiers comprising polyureas of greater than about 5,000 molecular weight prepared by reaction under appropriate conditions of a polyisocyanate and a diamine or mixture of diamines containing alkyleneoxy units having the following general structure:

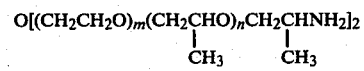

wherein m is from 0 to 30 and n is from 0 to 5 and wherein the polymer contains at least 70% by weight ethyleneoxy units.

2. A process as in claim 1 wherein the polyisocyanate is toluene diisocyanate.

3. A process as in claim 1 wherein m is about 21 and n is about 0.75.

4. A process as in claim 3 wherein an additional amine is present having m=0 and n ranging from about 2 to 6.

5. A process as in claim 4 wherein the additional amine has m=0 and n=about 2.6.

* * * * *